United States Patent Office 3,383,076
Patented May 14, 1968

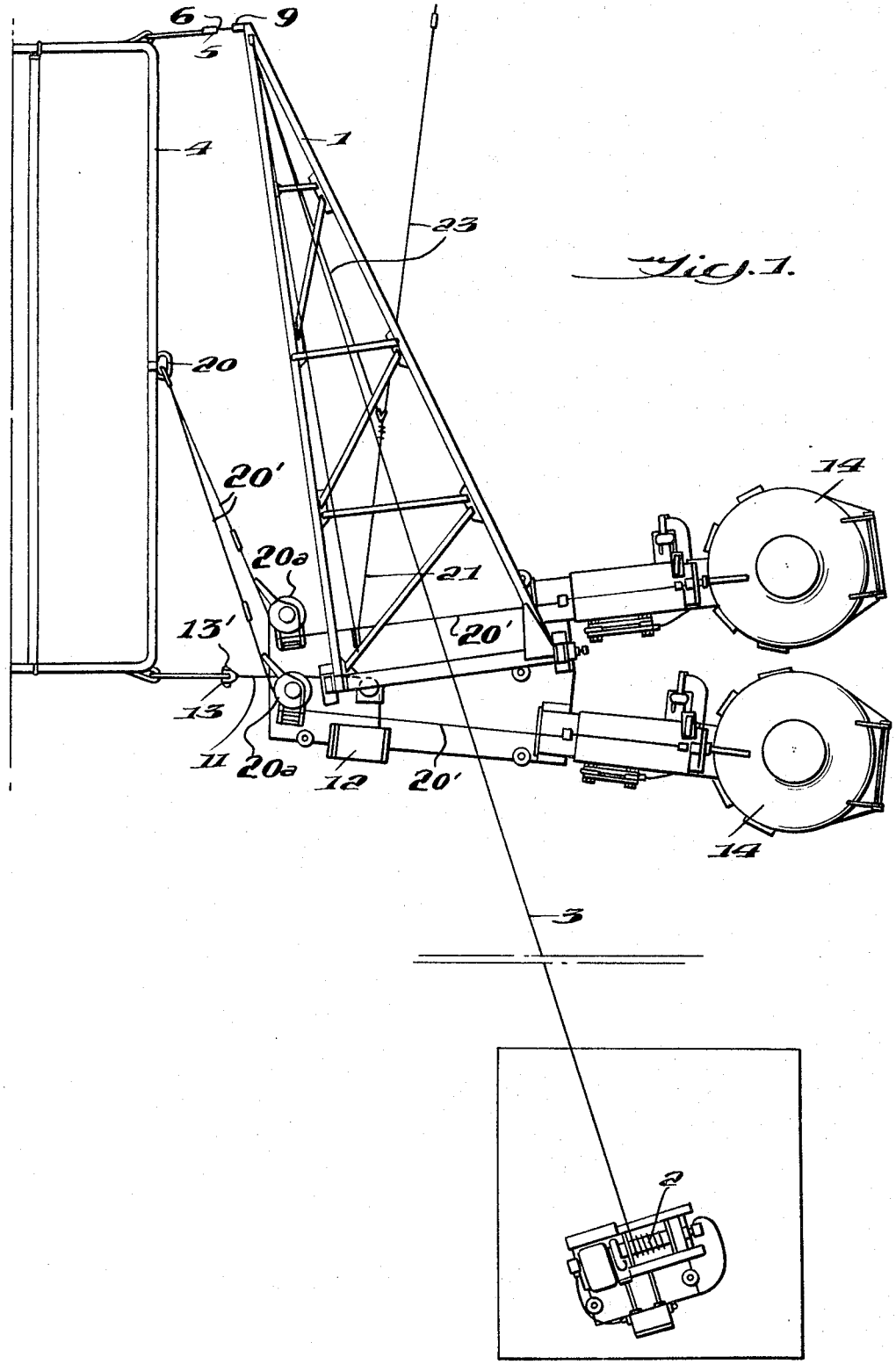

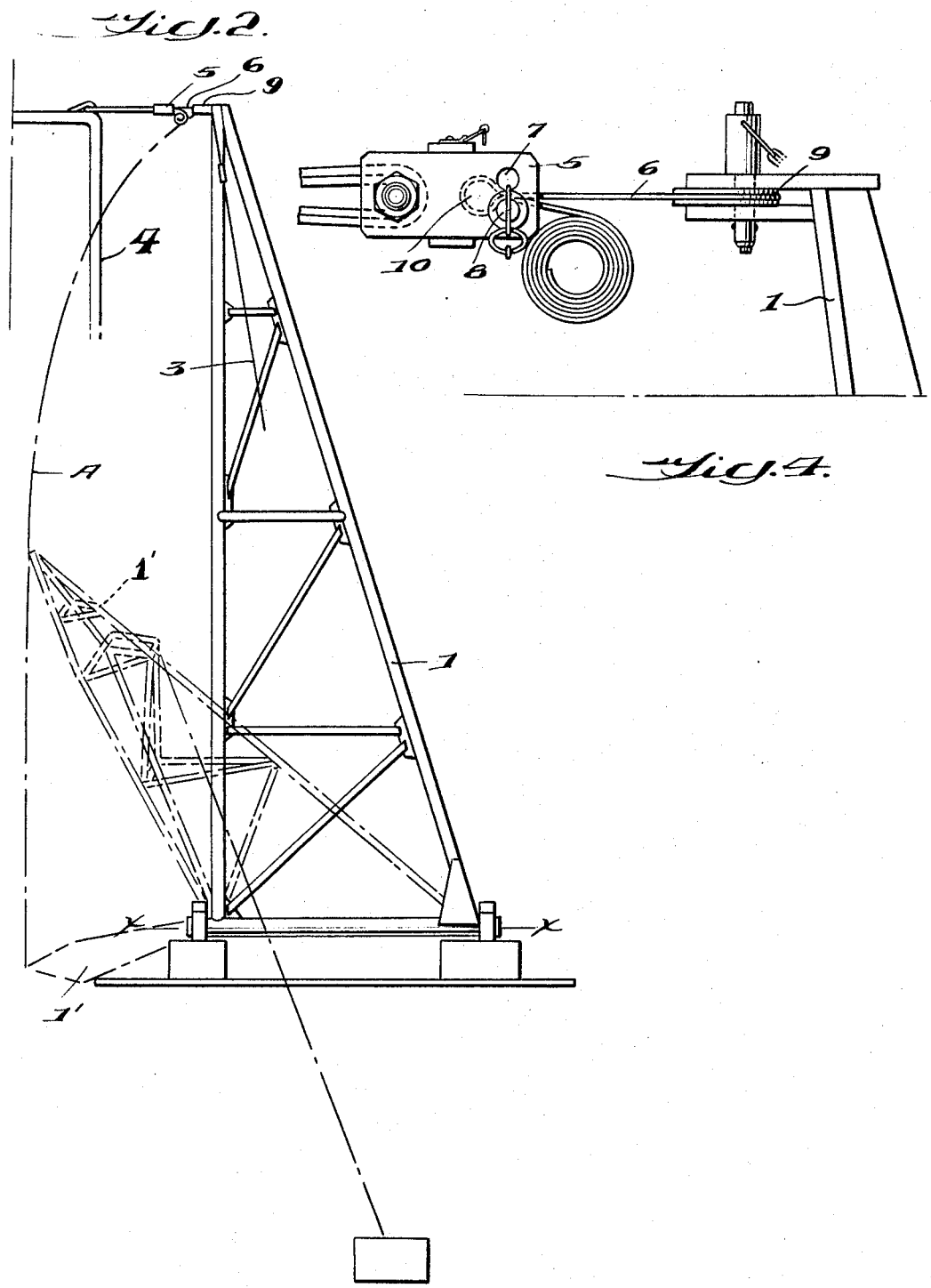

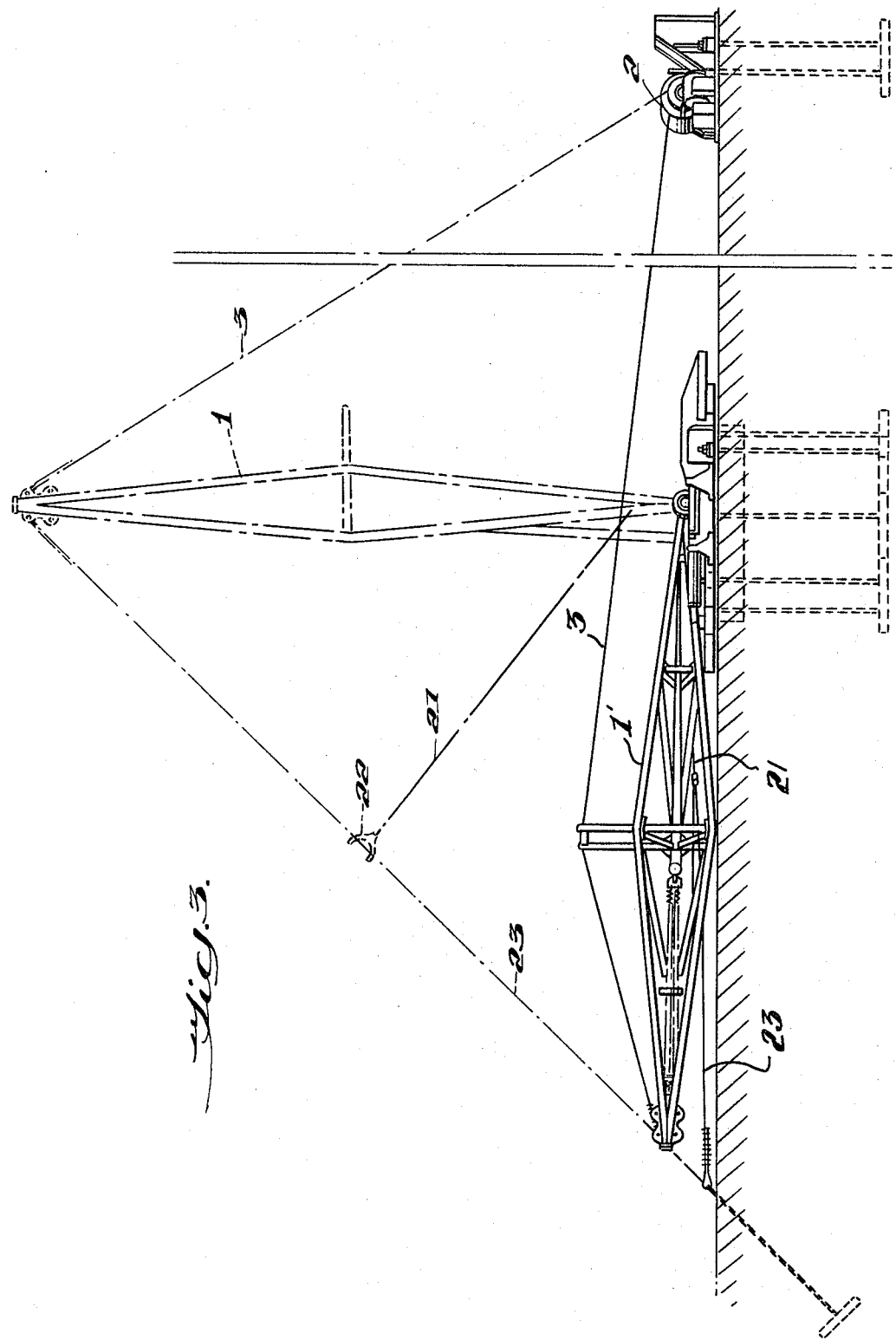

3,383,076
BARRICADE TENSIONING STANCHION
Willem D. van Zelm, Ruxton, and Martin A. Jackson, Bradshaw, Md., assignors to Van Zelm Associates Inc., Baltimore, Md., a corporation of Maryland
Filed Feb. 11, 1966, Ser. No. 526,894
3 Claims. (Cl. 244—110)

ABSTRACT OF THE DISCLOSURE

An aircraft barricade system having spaced pivotable net supporting stanchions about non-parallel axes canted to the path of aircraft landing so that the tops of the stanchions become progressively farther spaced as the stanchions move from a horizontal position to a vertical position.

Nylon nets have been used in barricade systems for arresting the motion of aircraft upon landing. The nets of nylon strap or other webbing are usually in place across the path of an aircraft but lowered into an inoperative position. When the net is needed to stop an aircraft upon landing, the net is raised to a vertical position. The ends of the net are attached to lines which in turn are secured to energy absorbing devices that pay out the line while absorbing the energy of the impact of the aircraft engaged by the net.

It is an object of this invention to provide an aircraft barricade comprising an improved stanchion arrangement.

It is another object of the invention to provide an aircraft barricade including stanchions which properly tension the netting of the barricade as they are erected into position.

It is another object of this invention to provide an aircraft barricade including stanchions which properly tension the netting of the barricade as they are erected into position.

It is another object of this invention to provide an aircraft barricade including a new and unique load limiting device.

It is another object of this invention to provide a stanchion assembly that will be hinged to lay flat on the landing surface to which the net may be secured, ready for raising into the operative position.

It is another object of this invention to provide a stanchion assembly that will, when erected into the operative position, place the net in predetermined tension.

Further and other objects will be apparent from the description of the accompanying drawings in which like reference characters designate like corresponding parts throughout the several views.

In the drawings:

FIGURE 1 is a plan view of the barricade in a ready position on the deck;

FIGURE 2 is an elevated view of the stanchion and net assembly in an erected position also showing the path followed by the tip of the stanchion during erection;

FIGURE 3 is a side elevational view of the stanchion showing the method of erection from the down to the erected positions; and FIGURE 4 is a fragmentary view of the stanchion and net connection showing the detail of the load limiter.

Referring now to the drawings, the construction of stanchion 1 is shown mounted on a landing field, a carrier deck or any other suitable anchoring or supporting base pivoted around axis X—X and adapted to be erected to a vertical position by means of any conventional winch 2. However, it should be noted that the pivotal axis X—X is not perpendicular to a side of the landing strip or the direction of landing of an aircraft, but is canted at a predetermined angle as shown in the drawings. The counterpart stanchion on the opposite side of the landing strip is similarly positioned and canted at a similar angle with respect to the landing strip. In the down position, the tops of the stanchions are closer to one another than they are when in the erected position due to the canted axis of the bases of the stanchion.

Each stanchion 1 is connected by cable 3 to an erecting winch 2. As the winch 2 is operated and the cable 3 draws the stanchions 1 into an erect position, they approach a parallel position until in a fully erected state, the respective tops and bases are equidistant from one another. It may readily be seen then that any line or net 4 stretched between the tops of the stanchions becomes increasingly taut as the stanchion is erected.

The difference in the distance between the tops of the stanchions when they are down compared to when they are erected is sufficient to allow for a slack net to be attached to the stanchions when they are down. The same net will be stretched to a high degree of tension load when erected, sufficient to provide a taut net at all times.

The tension of the net must not exceed the breaking strength of the material from which it is made. The arrangement described above is not the ultimate solution since each pair of stanchions would have to be tailored exactly to the strength of each net erected. To overcome this problem, a load limiting device 5 is provided between net 4 and each stanchion 1 to ensure that the breaking point of the net is not exceeded.

The load limiting device has been depicted in FIG. 4 and shall be described using a metal tape 6, but it should be understood that this element may be a strap, tape, rod or any filament of steel or other metal which can be bent to a degree exceeding its elastic limit, thereby absorbing energy by the bending of the metal.

The load limiter 5 consists of a housing and the metal element 6. The housing consists of two plates secured a desired distance apart. In the case where a metal tape is used, this distance may be any reasonable amount in excess of the width of said tape. The tape receiving end of the housing is formed to receive two pin members, one fixed 7, and the other removable 8. Pins 7 and 8 are situated in a plane perpendicular to the direction of tension. The distance between pins 7 and 8 will be explained in conjunction with the description of metal element 6.

Metal tape 6 is formed at one end to accommodate coupling means 9 to attach said tape to stanchion 1. A short distance from the same end, the tape is formed to receive a pin 10. The remainder of the tape may merely hang loose, but is preferably formed into a coil.

The diameter of pin 10 may vary to conform with the load which it is designed to impose upon tape 6 in cooperation with pins 7 and 8. The load may be varied by providing a tape or element of different width, thickness or hardness. Using these parameters, the diameter of the pin may remain constant while the load imposed may be varied by tape size.

The controlling factor in determining the distance between fixed pin 7 and removable pin 8 is that the distance between them must be greater than the double thickness of the thickest metal tape employed, and less than the diameter of the smallest pin 10 used plus twice the thickness of the thinnest tape used in combination therewith.

By selecting tape size and pin diameter, a load limiting device may be supplied to accommodate any strength net. The amount of load is determined by the size and nature of the barrier used.

In operation, the aircraft arresting device is deployed at the end of a runway in a down or ready position. Barrier net 4 is supported at its lower edge by cable 11 attached to small winch 12 by use of which a predetermined tension may be placed on the lower strand of said net. A clevis 13 having a shear pin 13' is provided to connect the cable to the net, which pin will break under a preselected load. The breaking load for the shear pin is such that it corresponds to that initial load required to pull the metal element from the load limiting device 5.

Net 4 is secured at or near a point 20 equidistant from both its upper and lower edges, to an energy absorbing device or devices 14 for example, by cables 20' directed about guide pulleys 20a. Energy absorber 14 is preferably in accordance with that which is described in U.S. Patent No. 2,979,163 or in U.S. Patent No. 3,211,260. One or more such units may be used on each side, depending on the size of the aircraft the system is designed to halt.

Barrier net 4 is supported and secured to the top of each stanchion through the load limiter tensioning device.

It will be seen from FIGURE 2 that stanchion 1 lays flat on the deck in position 1'. Net 4 is secured at the top 5 and the bottom through clevis 13 to the stanchion. For operation the stanchions on each side of the landing strip are raised as shown in FIGURES 2 and 3 to an erect position by a winch such as 2. An elastic line 21 has a slide coupling 22 that engages a guide wire 23 on the side of the stanchion opposite of lines 3 and winch 2 to maintain the stanchion in an erect position. The elastic member 21 is positioned in the assembly to keep guide wire 23 out of the way of the other rigging either in the ready position or in the operative position.

As will be seen in FIGURE 2 the tip of stanchion 1 moves in a curved path A as shown in FIGURE 2 so that the edge of net 4 will be tensioned and the top and bottom edges held generally parallel with the landing strip.

When an aircraft strikes barrier net 4, the elasticity of the net permits the net momentarily to travel with the aircraft. Then, almost simultaneously, load limiter 5 and shear pin 13 release the barrier net, causing it to collapse about the aircraft. All of the momentum of the aircraft is transferred to energy absorbing devices 14 and the aircraft is brought to a smooth stop.

It is to be understood that the embodiments shown are illustrative of the principal operation of an aircraft arresting device incorporating a unique load limiting device for ensuring proper net tension and a unique stanchion configuration and that certain changes, alterations, modifications or substitutions can be made in the structure of the devices without departing from the spirit and scope of the claims.

What is claimed is:

1. An aircraft barricade system having an aircraft arresting net suspended between first and second pivotable stanchions respectively mounted on a base for pivotable movement about non-parallel axes oriented to position the top of said stanchions closer to each other when said stanchions are pivoted to a substantially horizontal position to lower said net than when said stanchions are positioned in a substantially vertical position so that simultaneous pivotable movement of said stanchions from their substantially horizontal position to their substantially vertical position serves to tension said net and movement of said stanchions to their horizontal position slackens said net and a load limiting device on the upper end of each of said stanchions, said load limiting devices each comprising two metal plates secured together a fixed distance apart, said metal plates having means on one end thereof for attachment to said net, said metal plates having affixed therebetween at the other end thereof a first rod-like member and a second rod-like member, said plates having openings formed therein on the same plane ass aid first rod-like member for removably receiving said second rod-like member in inserted relation therethrough, a length of metal element having means at one end for attachment to said stanchion, said metal element forming a loop receiving a third rod-like member disposed adjacent said first and second rod-like members, the loop being constricted between said first and second rod-like members, with the third rod-like member permitting extraction of said element from between said first and second rod-like members only upon application thereto of a predetermined force.

2. An aircraft barricade system having an aircraft arresting net suspended between first and second pivotable stanchions respectively mounted on a base for pivotable movement about non-parallel axes oriented to position the top of said stanchions closer to each other when said stanchions are pivoted to a substantially horizontal position to lower said net than when said stanchions are positioned in a substantially vertical position so that simultaneous pivotable movement of said stanchions from a substantially horizontal position to their substantially vertical positions serve to tension said net and movement of said stanchions to their horizontal positions slackens said net, means secured at the upper ends of said stanchions for attachment to said net including a load limiting device, said load limiting devices each respectively comprising two metal plates secured together a fixed distance apart, said metal plates having fixed therebetween and at their other ends thereof a first rod-like member, said plates having openings formed therein on the same plane as said rod-like member such that a second rod-like member may be inserted therethrough, a length of metal element having means at one end for attachment to said stanchions, said metal element forming a loop receiving a third rod-like member disposed adjacent said first and second rod-like members, the loop being constricted between said first and second rod-like members with the third rod-like member permitting extraction of said elements from between said first and second rod-like members only upon application thereto of a predetermined force, a plurality of energy absorbing devices secured to said base, means attaching said net adjacent the end thereof to said energy absorbing devices, and means attaching said net at its lower corners to means for maintaining a predetermined amount of tension in the lower portion of said net.

3. A load limiting device comprising two metal plates secured together a fixed distance apart, a first rod-like member extending between said metal plates, a second rod-like member extending between said metal plates, a length of metal element having means at one end for attachment to a first relatively fixed support member, said metal element forming a loop receiving a third rod-like member disposed adjacent said first and second rod-like members, said loop being constructed between said first and second rod-like members with the third rod-like member permitting extraction of said element from between said first and second rod-like members upon the application of a predetermined force to said plates with the force being resisted by said fixed support.

References Cited

UNITED STATES PATENTS

| | | | |
|---|---|---|---|
| 2,854,201 | 9/1958 | Cotton | 244—110 |
| 2,913,197 | 11/1959 | Fondén et al. | 244—110 |
| 3,087,584 | 4/1963 | Jackson et al. | 188—1 |
| 3,128,972 | 4/1964 | Fondén et al. | 244—110 |

FOREIGN PATENTS

| | | |
|---|---|---|
| 1,159,730 | 8/1956 | France. |
| 1,222,670 | 1/1959 | France. |
| 168,621 | 9/1959 | Sweden. |

MILTON BUCHLER, *Primary Examiner.*

P. E. SAUBERER, *Assistant Examiner.*